March 11, 1941. H. H. THOMPSON 2,234,507
LOW PRESSURE TIRE ALARM
Filed Oct. 31, 1940 2 Sheets-Sheet 1

Inventor
Howard H. Thompson
By Clarence A. O'Brien
Attorney

March 11, 1941. H. H. THOMPSON 2,234,507
LOW PRESSURE TIRE ALARM
Filed Oct. 31, 1940 2 Sheets-Sheet 2

Inventor
Howard H. Thompson
By Clarence A. O'Brien
Attorney

Patented Mar. 11, 1941

2,234,507

UNITED STATES PATENT OFFICE 2,234,507

LOW PRESSURE TIRE ALARM

Howard H. Thompson, Santa Cruz, Calif.

Application October 31, 1940, Serial No. 363,764

3 Claims. (Cl. 116—34)

This invention relates to a low pressure tire alarm, the general object of the invention being to provide means for giving an alarm when the tire becomes deflated to a certain extent so that the operator of the vehicle will know that his tire needs inflation, through means of a sound producing device located in the tube of the tire and actuated during rotary movement of the wheel when the pressure in the tire is reduced to a certain degree.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 1:
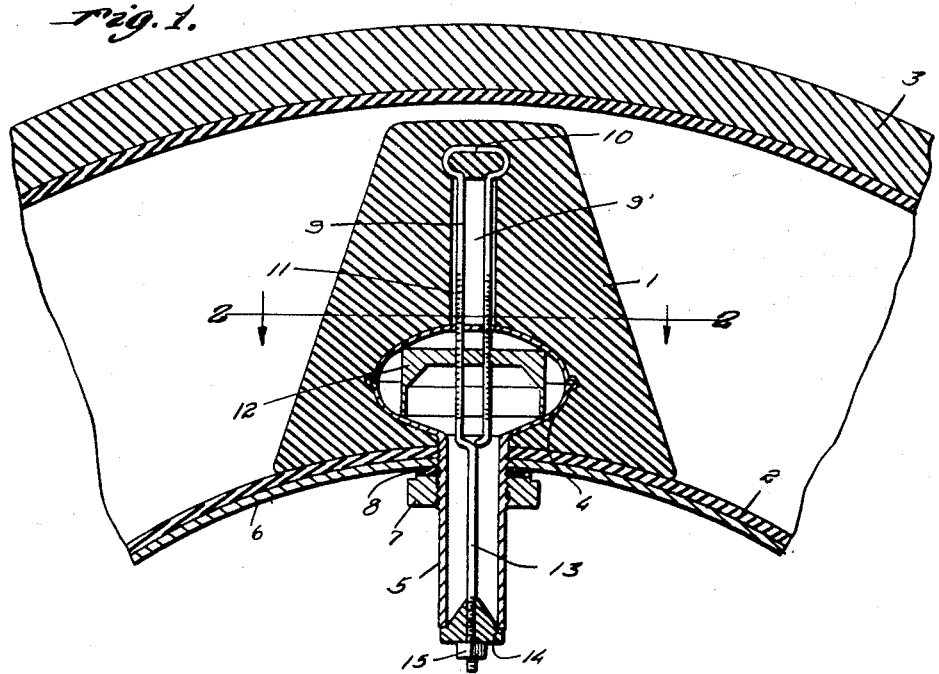
Figure 1 is a fragmentary sectional view taken circumferentially of the tire and showing the invention therein.
Figure 2:
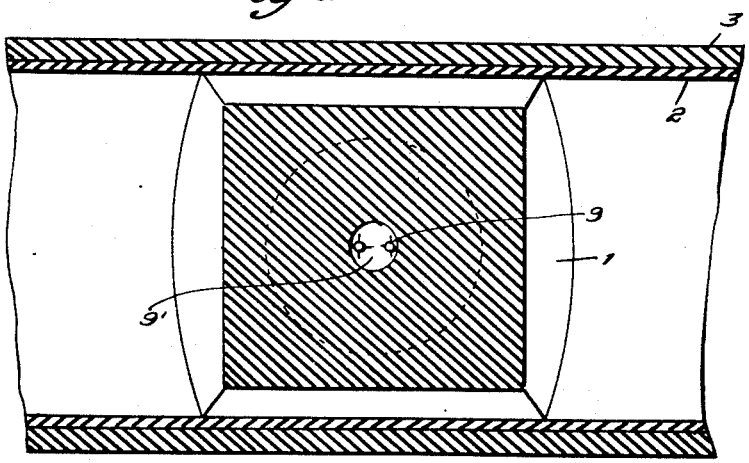
Figure 2 is a section on the line 2—2 of Figure 1.
Figure 3:
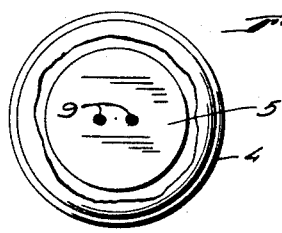
Figure 3 is a view of the casing containing the sound producing parts with a part of the casing broken away.
Figure 4:
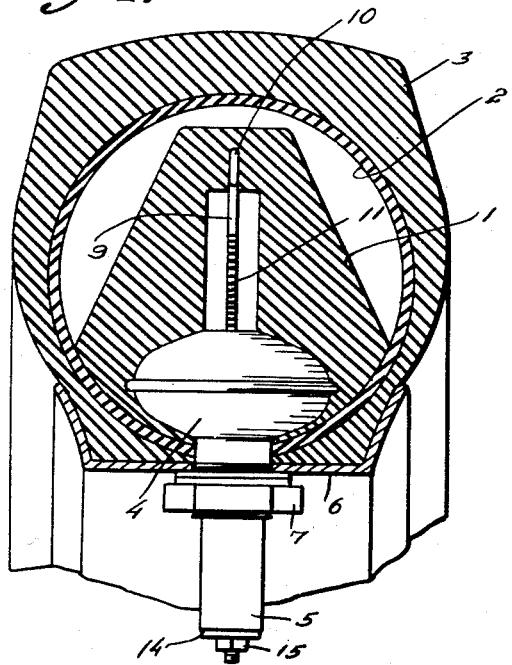
Figure 4 is a transverse sectional view through Figure 1.
Figure 5:
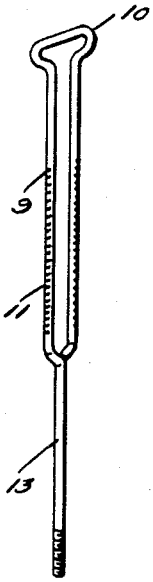
Figure 5 is a view of the plunger.

In these drawings the numeral 1 indicates a block of rubber which is of substantially the shape of a pyramid and this block is located in the tube 2 of a tire 3 with its large end suitably connected with the inner circumference of the tube, such as being vulcanized to the wall of the tube with said block extending radially as shown. A metal casing 4 is embedded in the block and has a tubular stem 5 extending through the large end of the block and through the tube, this stem passing through the space between the beads of the tire and through the tire carrying rim 6. A portion of the stem is threaded to receive a nut 7 which clamps the device to the rim, a gasket 8 being located between the rim and the nut. A recess 9′ is formed in the block for receiving the U-shaped plunger 9 which has its bight enlarged as shown at 10 and this bight is embedded in the block. The limbs of the plunger extend through the chamber 9′ and through holes formed in the top of the casing and portions of the limbs are roughened as shown at 11 and these roughened parts pass through a circular member 12 of such construction that sliding movement of the roughened parts through the member 12 will produce a noise. The plunger terminates in a single shank 13 which is threaded to receive a threaded hole in a valve 14 and a nut 15 is threaded on the shank to hold the valve in adjusted position, this valve normally engaging the inner end of the tubular shank 5 by the pressure exerted on the head or bight 10 of the plunger by the rubber member 1. Thus if the tire becomes deflated to a certain extent, during the rotation of the wheel and when the part carrying the device contacts the road surface the outer circumference of the tube will be pressed against the outer end of the block 1 so that the block will be compressed and this will cause the plunger to be forced upwardly so that the roughened parts of its limbs will slide through the member 12 and thus produce a noise and at the same time the valve 14 will be opened so that the sound waves can readily pass from the device. Thus the operator of the vehicle will hear the noise produced by the device and will thus know that the tire needs inflation. After the part of the tire carrying the device moves upwardly from the road surface the block will expand and thus move the plunger in an opposite direction to again produce a noise.

Figure 6:
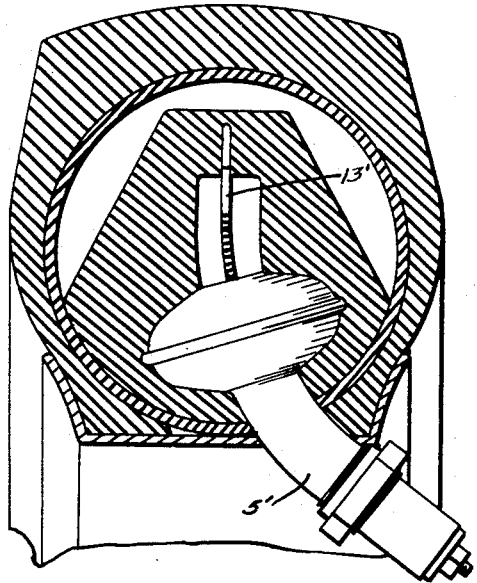
Figure 6 is a view similar to Figure 4 and showing a modification for use with a disk or similar type wheel.
Figure 7:
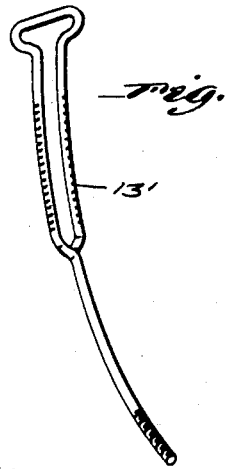
Figure 7 is a view of the plunger used in this form of the invention.

The tubular shank 5 is made straight when the wheel is provided with spokes but when the device is used on a wheel provided with a disk center or the wheel is otherwise formed that it cannot receive a straight tubular shank then the shank is curved as shown at 5′ in Figure 6 and the plunger is also of curved construction as shown at 13′ in Figure 7.

Thus it will be seen that I have provided a simple form of sound producing device which will produce a noise every time the part of the tire carrying the device strikes the ground and such part rises from the ground. As will be seen the valve holds the device closed until the plunger is actuated and then the valve opens to permit the sound waves to pass from the device and then as the plunger moves outwardly in a radial direction the valve is closed.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a low pressure tire alarm, a block of resilient material fixedly carried in the tube of a tire and adapted to be compressed when the part of the tire carrying the same strikes the ground and the tire needs inflation, a plunger carried by the block, a chamber in the block, a member in the chamber and through which the plunger passes, said plunger and member being formed to have relative movement when said block is compressed and to produce a noise by relative movement of the parts.

2. In a device of the class described, a block of resilient material fixedly carried in a tube of a tire and adapted to be compressed when the part of the tire carrying the same engages the ground and the tire needs inflation, a chamber forming member embedded in the block and having a tubular stem extending from the tire, means for fastening the stem to the rim of a wheel, a member having holes therein located in the chamber, a plunger of substantially U-shape having its head embedded in the block with its limbs roughened and passing through the holes in the member and through holes in the chamber forming member, said plunger moving through the holes of the member when the block is compressed when the part of the tire carrying the block strikes the ground and the tire needs inflation, said roughened limbs being adapted to engage said member when moving therethrough and thereby produce a warning noise, a valve carried by the inner end of the plunger for closing the end of the tubular shank when the parts are in inoperative position.

3. In a low pressure tire alarm, a block of resilient material fixedly carried in the tube of a tire, a plunger carried by the block, a tubular stem extending from the tire and having an enlarged part located in the block, a disk-shaped member of metal located in the enlarged part and having holes therein through which roughened parts of the plunger pass, said plunger moving through the holes of the disk-shaped member when the resilient block is compressed when the part of the tire carrying the block strikes the ground and the tire needs inflation and said roughened parts of the plunger being adapted to engage the disk-shaped member when moving through the holes therein and thereby produce a warning noise, and a valve carried by the plunger for closing the tubular stem when the parts are in inoperative position.

HOWARD H. THOMPSON.